US011530488B2

(12) United States Patent
Neily

(10) Patent No.: US 11,530,488 B2
(45) Date of Patent: Dec. 20, 2022

(54) COPPER MOLD FOR GLOVES

(71) Applicant: Ryan Neily, Pueblo, CO (US)

(72) Inventor: Ryan Neily, Pueblo, CO (US)

(*) Notice: Subject to any disclaimer, the term of this patent is extended or adjusted under 35 U.S.C. 154(b) by 0 days.

(21) Appl. No.: 17/127,644

(22) Filed: Dec. 18, 2020

(65) Prior Publication Data

US 2022/0195615 A1 Jun. 23, 2022

(51) Int. Cl.
| | |
|---|---|
| *C25D 1/10* | (2006.01) |
| *C25D 1/00* | (2006.01) |
| *C25D 3/38* | (2006.01) |
| *C25D 3/12* | (2006.01) |
| *C25D 5/12* | (2006.01) |
| *C25D 7/00* | (2006.01) |
| *B05D 7/02* | (2006.01) |
| *B05D 7/26* | (2006.01) |
| *B29D 99/00* | (2010.01) |
| *B29C 33/38* | (2006.01) |
| *A41D 19/04* | (2006.01) |

(52) U.S. Cl.
CPC .............. *C25D 1/10* (2013.01); *A41D 19/04* (2013.01); *B05D 7/02* (2013.01); *B05D 7/26* (2013.01); *B29C 33/3842* (2013.01); *B29D 99/0067* (2013.01); *C25D 1/003* (2013.01); *C25D 3/12* (2013.01); *C25D 3/38* (2013.01); *C25D 5/12* (2013.01); *C25D 7/00* (2013.01); B29K 2905/10 (2013.01)

(58) Field of Classification Search
None
See application file for complete search history.

(56) References Cited

U.S. PATENT DOCUMENTS

| | | | | | |
|---|---|---|---|---|---|
| 2,810,161 | A | * | 10/1957 | Milton, Jr. .............. | B29C 33/00 264/222 |
| 2,846,377 | A | * | 8/1958 | Ross ........................ | C25D 1/10 205/69 |
| 2019/0201675 | A1 | * | 7/2019 | Miller .................... | C25D 1/003 |

FOREIGN PATENT DOCUMENTS

| | | | | | |
|---|---|---|---|---|---|
| CN | 108441897 | | * | 8/2018 | ............... C25D 1/00 |
| TW | 550311 | | * | 8/2002 | ............... C25D 1/10 |

OTHER PUBLICATIONS

Karsa, David R., "Surfactants in Polymers, Coatings, Inks and Adhesives", 2003 (excerpt). (Year: 2003).*
Fry, B., "Working with Vinyl", 1999. (Year: 1999).*
Sculpey, "Can you rebake polymer clay?", https://www.sculpey.com/create/blog/can-you-rebake-polymer-clay Aug. 4, 2020, (Year: 2020).*

(Continued)

*Primary Examiner* — Stefanie S Wittenberg
(74) *Attorney, Agent, or Firm* — Jonathan B. David

(57) ABSTRACT

Methods and processes are described that enable the manufacture of a superior thin-walled mold from which higher-quality, less-costly disposable gloves can be more efficiently produced. The method can include creating a glove form in a sacrificial material; electroforming an electroformed master from the glove form; removing sacrificial material from the electroformed master; creating a tertiary form from the electroformed master; forming an initial copper layering on the tertiary form; and developing the initial copper layering into a thick copper plating to create a copper mold for gloves.

4 Claims, 2 Drawing Sheets

(56) References Cited

OTHER PUBLICATIONS

Electroforming Artist "Polymer Clay vs Epoxy Clay: Which Is Best For Electroforming?", https://electroformingartist.com/polymer-clay-vs-epoxy-clay/, May 22, 2020 (Year: 2020).*

"How to use liquid sculpey with molds", https://www.sculpey.com/create/blog/how-to-use-liquid-sculpey-with-molds, Nov. 4, 2020 (Year: 2020).*

* cited by examiner

COPPER MOLD FOR GLOVES

TECHNICAL FIELD

The present invention relates generally to the field of disposable gloves, and more particularly, to methods and processes for creating a superior mold from which higher-quality disposable gloves can be more efficiently produced.

BACKGROUND

Since the early days of forming metals thousands of years ago, humans have utilized investment casting/lost-wax casting to create objects. In more recent times, the development of plastics, vinyls, rubbers, urethanes, and other materials has caused an explosion in the use of investment casting to inexpensively manufacture products formed from such materials.

However, the art of creating high-quality forms which are used to manufacture those products has lagged behind, especially in the field of the production of disposable gloves. Current form production processes lead to forms with imperfections that can cause pinholes in gloves that are produced from such forms. Further, the current forms are thick-walled and so use excess material and cool slowly, and are thus inefficient and slow in producing gloves therefrom. This requires a high number of forms (i.e, more expense) to produce a given number of gloves in a given time period. What is needed is a method and process for creating a superior mold from which better, less-costly disposable gloves can be more efficiently produced.

DETAILED DESCRIPTION

Figure 1:
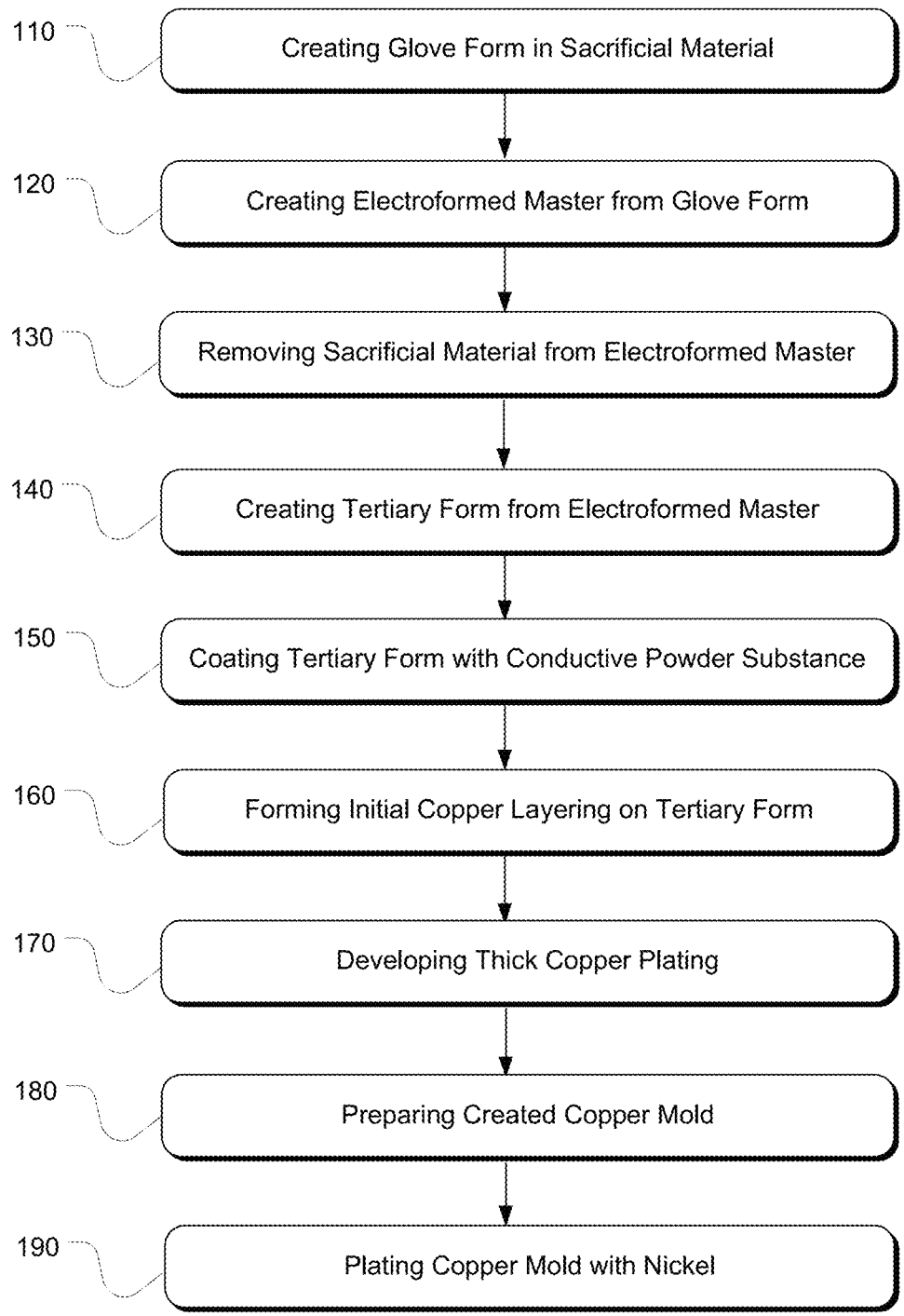
FIG. 1 illustrates an exemplary embodiment of operations for a novel method for creating a superior mold for gloves.

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples.

Exemplary embodiments are described below in the accompanying Figures. The following detailed description provides a comprehensive review of the drawing Figures in order to provide a thorough understanding of, and an enabling description for, these embodiments. One having ordinary skill in the art will understand that in some cases well-known structures, functions, methods and/or processes have not been shown or described in detail to avoid unnecessarily obscuring the description of the embodiments.

It is to be understood by any skilled in the art that the methods and processes described below can be implemented in various ways and with varying options without departing from the scope of the invention.

Referring now to the drawings, FIG. 1 illustrates an exemplary embodiment of operations 100 for a novel method or process of manufacturing a superior, thin-walled copper mold from which better, less-costly disposable gloves can be more efficiently produced.

The exemplary operations 100 shown in FIG. 1 comprise: Creating a Glove Form in Sacrificial Material 110; Creating Electroformed Master from Glove Form 120; Removing Sacrificial Material from Electroformed Master 130; Creating Tertiary Form from Electroformed Master 140; Coating Tertiary Form with Conductive Powder Substance 150; Forming Initial Copper Layering on Tertiary Form 160; Developing Thick Copper Plating 170; Preparing Created Copper Mold 180; and Plating Copper Mold with Nickel 190. Additional operations and sub-operations are contemplated in other embodiments.

The operation of Creating a Glove Form in Sacrificial Material 110 involves making a glove form in a sacrificial material such as wax. The glove form can be a one-size-fits all, or can be created in various sizes. Male/Female/Child sizes/configurations are also contemplated in various embodiments. Further, the initial glove form can be created in left and right versions or it can be ambidextrous. In another embodiment, the initial glove form can be created based on a particular person's pattern so that custom custom or semi-custom gloves can be produced. For example, a surgeon might benefit from a custom-run production of gloves that exactly fit him or her.

When producing the initial sacrificial material glove form, materials other than wax can be used, such as: tallow, resin, tar, textile, clay, plaster, etc. Basically, any material that is known in the art may be acceptable at this stage. Regardless of the sacrificial material used, it will be referred to as a wax and wax form or sacrificial material form herein.

The next operation is Creating an Electroformed Master from the Glove Form 120. This operation involves covering the wax form in a more durable substance. In one embodiment copper is used as the covering material, other embodiments are contemplated. Electroplating is a term that is occasionally discussed. This step does not involve electroplating. Instead, electroforming is employed.

Generally speaking, plating involves putting a thin, flash coat of metal on top of an existing item. This process can be done in as little as 30 seconds. Items such as jewelry often are formed from a base (i.e., cheap) metal and then plated using a precious metal such as gold or silver. Similarly, other commonly plated items are vehicle parts that are plated in chrome. Plating is performed to either enhance the aesthetic appearance of an item or to protect the underlying item with a harder material (such as chrome).

Electroforming, on the other hand, involves making an entire item out of a sacrificial material (wax, clay, plaster or other similar material can be used) and then forming a heavy, thick stratum of copper (or, in other embodiments, other metal(s) or material(s)) on top of the original item through electrodeposition of the metal onto the wax form. The original is then completely removed (often destroyed) leaving a new item that has been electroformed. The electroformed master can then be used as a form to produce others.

The next operation involves Removing the Sacrificial Material from the Electroformed Master 130. In one embodiment, after the heavy copper master has formed, it is remove from the electroforming apparatus and all the sacrificial material (e.g., wax) is removed out of the master. This can be accomplished in numerous ways. In one embodiment, a low temperature oven melts the sacrificial material which then can be drained or poured out of the master. The material can be captured and recycled for later reuse. In another embodiment, a higher temperature is utilized and the sacrificial material is thereby destroyed. In yet another embodiment, induction-coil heating is employed instead of using an oven. Regardless, all of the original form material should be completely removed from the new electroformed master.

Once the master is wax-free, the operation of Creating the Tertiary Form from the Electroformed Master 140 can begin. In one embodiment, vinyl is used. In other embodiments, other similar materials are employed, such as rubber, plastic, tallow, resin, tar, textile, clay, or plaster. In any case, the material used shall be referred to as vinyl herein. To begin this operation, vinyl is inserted into the electroformed master. In one embodiment, liquid vinyl is simply poured into the master. Other embodiments contemplate other means of spraying or otherwise coating the inside of the master with vinyl.

The electroformed master containing the vinyl can then be placed in an oven cooked for a relatively short duration. In one embodiment, only fifteen to twenty minutes is necessary, depending on the material, the oven temperature, etc. After the cooking time has been reached, the electroformed master is then removed from the oven and the extra vinyl is removed; in one embodiment, by simply pouring out the excess. The master is then re-inserted into the oven to warm the remaining vinyl. This causes the vinyl to become soft and malleable. After the master is allowed to finish "baking"/"cooking", it is taken out of the oven to cool down.

Once somewhat cool, a tertiary form can be extracted from the electroformed master. This is accomplished in one embodiment by using an air piston to pull the tertiary form out of the master with air. Other methods are contemplated.

The extracted tertiary form then needs to cool and as it does so, it gradually goes back into shape and becomes fairly hard, depending on the materials used. It is preferable that the tertiary form is somewhat flexible and yet becomes fairly hard and resilient when cool.

The newly created tertiary form needs to have a conductive surface. Said conductive surface can be created or added to the electroformed master before or during formation of the tertiary form; said conductive surface then is a part of the tertiary form upon its subsequent creation via the electroformed master. In another embodiment, the conductive surface is added to the tertiary form after the tertiary form is created. The operation of Coating the Tertiary Form with a Conductive Powder Substance 150 accomplishes the process of making at least the surface of the tertiary form conductive. In on embodiment, a conductive powder substance can be first prepared by mixing a conductive powder, often a metal powder, (in one embodiment, a copper powder) with a lacquer and a thinner. The lacquer can be any similar material having at least some lacquer-like properties; a common lacquer such as is used for clear-coating wood or mixing paint can be employed. Similarly, the thinner can be similar to a paint thinner material and is used to thin out the substance so that it can be sprayed to form a coating and might be needed if the substance is otherwise too thick. Once the conductive powder substance has been prepared, it is deposited onto the outer surfaces of the tertiary form.

In one embodiment, the prepared conductive powder substance is loaded into a spray device and then sprayed in a thin layer onto the tertiary form. After drying, the resulting stratum of dried conductive powder substance creates an electrical conducting surface on the tertiary form. In another embodiment, the conductive powder substance is applied to the surface of the electroformed master before the formation of the tertiary form thereon. In yet another embodiment, the material comprising the tertiary form is itself conductive and so the operation of coating tertiary form with conductive powder substance occurs inherently upon the selection of the conductive material for the tertiary form and applying said material to the master.

Forming an Initial Copper Layering on the Tertiary Form is operation 160. In one embodiment, an acid copper solution bath is employed. In another embodiment, other metal (s) solution(s) bath(s) can be utilized. In yet another embodiment, a non-metal solution bath is used. Regardless, this bath will be referred to as a copper solution bath. A rectifier (or similar source of electricity) can be employed to create an electrical current. In one embodiment, the tertiary form with a layer of sprayed-on copper is placed into the copper solution bath and then the solution can be circulated while applying a relatively small amount of electricity (approximately four to five amps in one embodiment). This will cause a layer of material, in this case copper, to form on the sprayed-on copper layer. Once the form is completely coated with a layer of copper, the amp needle on the rectifier will begin to climb to approximately ten amps or so (after approximately fifteen minutes).

During the Forming an Initial Copper Layering on the Tertiary Form operation 160, air or other compressed gas (hereinafter simply referred to as "air") should be utilized in the copper solution bath. A clean source of air such as from a Roots-type blower (or other oil-free source of compressed air) should be used so as not to contaminate the bath with foreign substance(s). The air bubbling process should be run on a low setting during the first minutes of the layering process as otherwise it is possible for the air to "blow off" the copper that is starting to layer.

In one embodiment, air is used to keep the solution circulating during the layering process, by introducing a positive airflow into the solution through a piping system near the bottom of the tank. In one example, simple PVC pipe of three quarters inch size is used in the tank, other diameters and types of piping/tubing/air-carrying-devices (collectively, "pipe") are contemplated. In one construction, legs or some other means are used to ensure the air leaves the pipe and enters the tank a short distance from the bottom surface of the tank. In one embodiment, the pipe is placed approximately three inches from the bottom. The pipe has small holes in the downward facing portions and running at approximately a 45 degree angle off of straight downwards. Air can then be forced through the pipe so the air blows downwards towards the tank bottom and then naturally rises upwards. Depending on the size of the platting tank utilized, two, three, or even more pipes can be run along near the bottom of the tank to ensure plenty of air flow into the solution. An industrial Roots-type blower run by an electric motor of three quarters or one horsepower will push sufficient air for a few good size plating tanks at one time. Using a blower having an output diameter of approximately three inches and then reducing that size down to three quarters inch can be done in one embodiment. When running one tank, or when there is otherwise an excess of air, a simple venting system can be added with a valve to reduce airflow into the tank(s). Other means of reducing/increasing/controlling airflow are contemplated. However, it is important to note that having too little airflow is usually more of an issue than having too much, especially during the next operation described below.

Developing a Thick Copper Plating is operation 170. In one embodiment, once the appropriate thickness of copper has been reached, the rectifier (or electrical source) can be turned up so that approximately twenty amps is indicated. This will help to speed up the process. However, it is important to note that if the amps are turned up too soon, the copper will "fry on", which makes it deposit in a granular manner, resulting in a poor quality item. Such an item will have copper granules on the surface that can be simply brushed off by hand.

Along with increasing the amps, the air flow can be increased as well. In one embodiment, a solution level is maintained at approximately a foot from the top of the bath tank, leaving room to use significant air flow without bubbling too much of the solution out of the tank. If little or no air is utilized, the copper will "burn on" especially with too many amps used too soon, yielding a poor product or complete failure.

Once the rectifier has been turned up to twenty amps, the plating operation should be allowed to continue for sufficient time to form a robust, thick copper stratum on the vinyl mold, this can require ten to twelve hours given the above plating operation. In other embodiments, where other plating operations are utilized, shorter or longer times may be necessary.

Once the stratum of copper is thick and robust, the operation of Preparing the Created Copper Mold 180 can begin. In this operation, the vinyl mold with its thick copper outer mold is removed from the solution bath and the vinyl is popped out of the copper mold (note that this term can be inclusive of other materials besides copper). The surface of the resulting hollow copper mold can be sandblasted or otherwise treated to prepare it for receiving a layer of nickel or other hard finish material.

The next operation is the Plating of the Copper Mold with Nickel 190. This operation enhances the hardness of the copper mold as well as its ability to withstand wear. Furthermore, nickel (or other similar substance in other embodiments) has properties that allow an easier release of the glove materials that are formed thereon.

Note that in other embodiments, additional and/or varying operations and sub-operations are contemplated.

Once the nickel plated copper mold is created using the above methods, it may then be used to make gloves, including urethane gloves (which are needle-resistant). For example, adding a coating of polypropylene on the mold will help to release a urethane glove made thereon. Additionally, it is possible to create a glove with texture by adding texture to the mold; in one example, very small inverted cone shapes are used.

Figure 2:
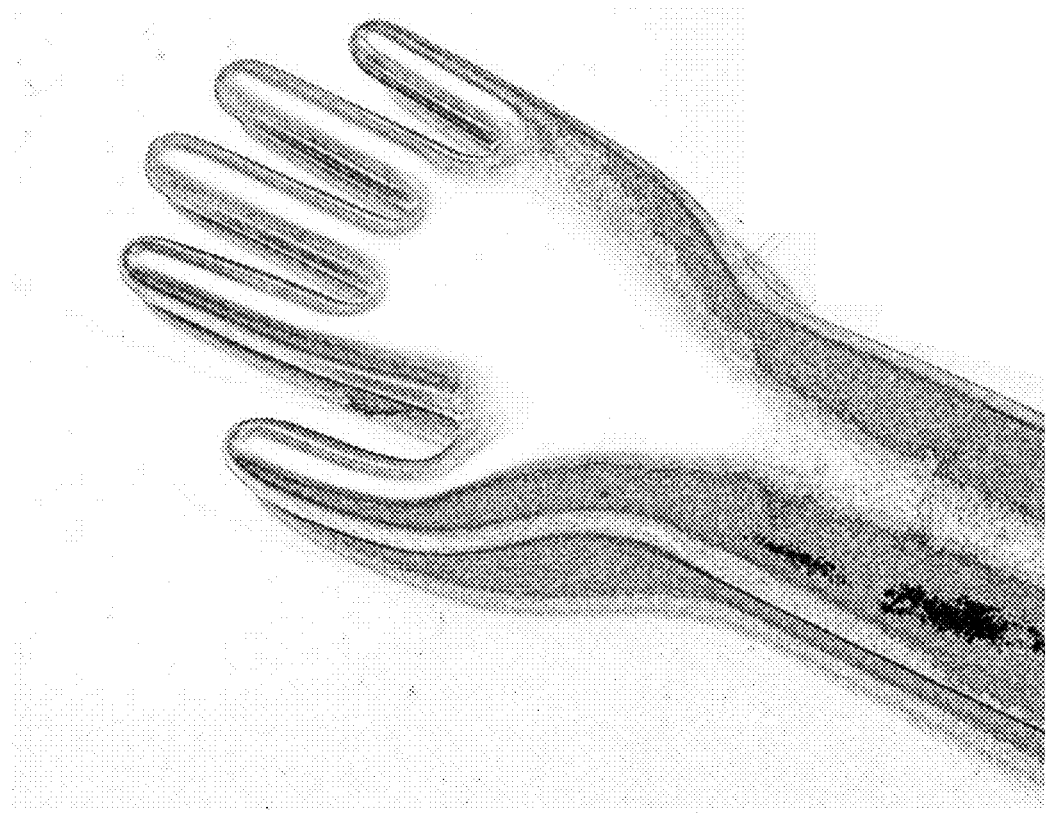
FIG. 2 illustrates an exemplary embodiment of a nickel-plated copper mold for gloves produced using the disclosed novel method.

FIG. 2 illustrates an exemplary embodiment of a nickel-plated copper mold 200 produced using the disclosed novel method. This superior mold can produce higher-quality disposable gloves more efficiently than prior art molds. This is because the mold is produced quickly and cheaply and yet is higher quality so it is less likely to produce gloves with pinhole imperfections. Additionally, although the copper stratum is described above as "thick" this is only in reference to known electroplating methods which create a very thin layer (sometimes only enough to disguise the underlying material and having little or no structural integrity to stand-alone or resist deformation if that underlying material is removed). Instead, although robust and strong enough to be handled and used as a glove mold, the created copper mold made utilizing the above methods has relatively thin walls compared to known molds. This allows the created copper mold to be manufactured with less material expense, as well as causing it to heat and cool more quickly versus a thick-walled mold during the glove creation process, thereby speeding up said process.

While particular embodiments have been described and disclosed in the present application, it is clear that any number of permutations, modifications, or embodiments may be made without departing from the spirit and the scope of this disclosure.

Particular terminology used when describing certain features or aspects of the embodiments should not be taken to imply that the terminology is being redefined herein to be restricted to any specific characteristics, features, or aspects with which that terminology is associated. In general, the terms used in the following claims should not be construed to be limited to the specific embodiments disclosed in the specification, unless the above Detailed Description section explicitly defines such terms. Accordingly, the actual scope of the claims encompasses not only the disclosed embodiments, but also all equivalent ways of practicing or implementing the claimed subject matter.

The above detailed description of the embodiments is not intended to be exhaustive or to limit the disclosure to the precise embodiment or form disclosed herein or to the particular fields of usage mentioned above. While specific embodiments and examples are described above for illustrative purposes, various equivalent modifications are possible within the scope of the disclosure, as those skilled in the relevant art will recognize. Also, the teachings of the embodiments provided herein can be applied to other systems, not necessarily the system described above. The elements and acts of the various embodiments described above can be combined to provide further embodiments.

Any patents, applications and other references that may be listed in accompanying or subsequent filing papers, are incorporated herein by reference. Aspects of embodiments can be modified, if necessary, to employ the systems, functions, and concepts of the various references to provide yet further embodiments.

In light of the above "Detailed Description," the Inventor may make changes to the disclosure. While the detailed description outlines possible embodiments and discloses the best mode contemplated, no matter how detailed the above appears in text, embodiments may be practiced in a myriad of ways.

Thus, implementation details may vary considerably while still being encompassed by the spirit of the embodiments as disclosed by the inventor. As discussed herein, specific terminology used when describing certain features or aspects should not be taken to imply that the terminology is being redefined herein to be restricted to any specific characteristics, features, or aspects of the embodiments with which that terminology is associated.

While certain aspects are presented below in certain claim forms, the inventor contemplates the various aspects in any number of claim forms. Accordingly, the inventor reserves the right to add additional claims after filing the application to pursue such additional claim forms for other aspects.

The above specification, examples and data provide a description of the structure and use of exemplary implementations of the described systems, articles of manufacture, processes and methods. It is important to note that many implementations can be made without departing from the spirit and scope of the disclosure.

What is claimed is:

1. A method of creating an improved copper mold for gloves, comprising:
   creating a glove form in a sacrificial material;
   electroforming an electroformed master from the glove form;
   removing the sacrificial material from electroformed master;

creating a tertiary form from the electroformed master, wherein vinyl is inserted, poured, sprayed or coated inside the electroformed master, wherein the electroformed master is placed in an oven for cooking in a plurality of intervals, placing the electroformed master in the oven for a first cooking interval, removing the electroformed master from the oven to remove excess vinyl and reduce the vinyl from the electroformed master, wherein the excess vinyl is poured out of the electroformed master, and repositioning the electroformed master in the oven for a second cooking interval, wherein the second cooking interval is a softening interval to soften the remaining vinyl and increase a malleability of the remaining vinyl;

coating the tertiary form with a conductive powder substance;

forming an initial copper layering on the tertiary form; and developing the initial copper layering into a thick copper plating to create a copper mold for gloves.

2. The method of claim 1, further comprising:

preparing the copper mold; and plating the copper mold with nickel.

3. The method of claim 1, wherein the glove form is ambidextrous.

4. The method of claim 2, wherein the glove form is ambidextrous.

* * * * *